United States Patent [19]
Kim

[11] Patent Number: 6,020,977
[45] Date of Patent: Feb. 1, 2000

[54] METHOD FOR PRINTING LABEL OF OPTICAL DISC USING RAINBOW GRAPHIC CUTTING SYSTEM

[75] Inventor: Seon-Gyoung Kim, Kyungki-do, Rep. of Korea

[73] Assignee: LG Electronics Inc., Seoul, Rep. of Korea

[21] Appl. No.: 08/986,302

[22] Filed: Dec. 5, 1997

[30] Foreign Application Priority Data

Dec. 7, 1996 [KR] Rep. of Korea ................ 96-62784

[51] Int. Cl.[7] .................. G06K 15/02; B41J 2/435; B41J 2/47; B42D 15/00
[52] U.S. Cl. .................. 358/1.7; 358/1.12; 358/1.18; 347/232; 347/252; 283/81
[58] Field of Search .................. 395/112, 117, 395/107, 111; 369/44; 347/224, 225, 232, 251, 252; 283/81

[56] References Cited

U.S. PATENT DOCUMENTS

| | | | |
|---|---|---|---|
| 4,794,584 | 12/1988 | Hamer | 369/44 |
| 4,814,799 | 3/1989 | Lu | 346/160 |
| 5,489,768 | 2/1996 | Brownstein et al. | 235/487 |
| 5,510,163 | 4/1996 | Sullivan et al. | 428/64.1 |
| 5,518,325 | 5/1996 | Kahle | 347/2 |
| 5,799,982 | 9/1998 | McClure et al. | 283/81 |

*Primary Examiner*—Scott Rogers

[57] ABSTRACT

A method for printing a label on an optical disc using a rainbow graphic cutting system includes storing in a memory a location signal and color information data of the label to be printed on the surface of the optical disc. Corresponding location and data signals from among the location signals and the color information data are selectively output to a laser beam recorder LBR. A label corresponding to the signals output to the LBR is then printed on a surface of the optical disc.

18 Claims, 2 Drawing Sheets laser beam

METHOD FOR PRINTING LABEL OF OPTICAL DISC USING RAINBOW GRAPHIC CUTTING SYSTEM

BACKGROUND OF THE INVENTION

1. Field of the Invention

The present invention relates to an optical disc, and more particularly to a method for printing a label on the optical disc using a rainbow graphic cutting system (hereinafter, referred to as RGCS), which is used for printing a drawing or a letter on the surface of the optical disc by radiating laser light on the surface thereof.

2. Discussion of Related Art

In general, an optical disc can be called a compact disc (hereinafter, referred to as CD) whose diameter is 12 cm and whose memory capacity is 700MByte, thus being used as record media. In the manufacture process of the CD, a predetermined data is recorded on a glass substrate by radiating a laser beam thereon, the glass substrate being spread with photoresist. The surface of the glass substrate is developed and nickel is evaporated thereon. Thereafter, if the nickel is separated from the glass substrate, there is made a stamper which is the same as a record of the data. Finally, after resin is added to the surface of the stamper through an injection molding, the CD is manufactured.

In this case, if any title or any drawing must be label-printed on the surface of such a CD, there might arise distortion in the disc because of irregular spread or irregular pressure of printing ink thereon. So, new methods have been developed for label printing. One of them is to directly record data into the CD instead of the printing. And, the other is to cut the drawing or the letter on the surface of the CD by radiating the laser beam on the surface thereof.

There will be explained hereinafter a method for printing the label according to the prior art.

A DCA company in USA has used the method to cut the drawing or the letter on the surface of the CD by radiating the laser on from the surface thereof. That is, the DCA company uses the method for inputting data to the whole area of the optical disc by using a laser beam recorder (hereinafter, referred to as LBR). More in detail, the method by the DCA company is first to black-and-white edit the drawing or the letter which is intended to be printed by the company. Then, the next step is to temporarily store the edited drawing or letter in a buffer of a computer as location information of the disc. Thereby, as the information stored in the buffer of the computer is controlled, the label printing is completed by the operation of the LBR. At this time, there can be used just the LBR having constant angular velocity CAV in which the number of rotations of the disc is constant. In such a printing method, it takes at least 3–4 hours to print the label on the whole area of the optical disc.

However, there are some problems in the method according to the prior art. A first problem is that the drawing or the letter, which is intended to be printed on the optical disc, cannot be outputted to a monitor of the computer, since a printing location of the label is determined and stored in the text mode of the computer during editing. Thus, a user can not confirm the printing location of the label under operation until the printing operation is finished. A second problem is that such a printing method enables a black-and-white label printing only. The third problem is that it is difficult to consecutively use the optical disc which has just had label printing completed, since the operation of the LBR can be performed in only the CAV, not in CLV (Constant Linear Velocity) made. The last problem is that the time in requiring the label printing on the whole optical disc is too long.

SUMMARY OF THE INVENTION

Therefore, an object of the present invention is to provide a method for printing a label on the surface of an optical disc using of a rainbow graphic cutting system which enhances a label printing velocity in real time, regardless of a rotation mode of a laser beam recorder.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above object in accordance with the present invention, as embodied and broadly described, the method for printing the label on the surface of the optical disc comprises the steps of: storing in a memory a location signal and color information data of the label to be printed on the surface of the optical disc; selectively outputting a corresponding location signal and data signal from among the location signals and the color information data to a laser beam recorder LBR; and printing the label corresponding to the signal outputted to the LBR.

Further, in the present invention, the method for printing the label on the optical disc, comprises the steps of: graphic editing the label to be printed, converting information on location and color of data according to the radius and the angle in a coordinate system, and storing the converted information in a memory; counting a pulse signal according to the location of a spindle of a laser beam recorder, detecting the location of the spindle depending upon the number of counted pulses, and outputting data signal corresponding to the detected location among RGCS files; and printing the label on the optical disc based on an on/off operation of a laser beam by means of a switching operation of an acousto optical modulator.

Furthermore, in the present invention, the method for printing the label on the optical disc, comprises the steps of: generating, from a level signal generating portion, a plurality of level signals whose duty cycles are different from each other; selectively outputting the level signal corresponding to a detected location among the level signals generated from a data selecting portion; and printing the label by the gray level corresponding to the level signal through the laser beam recorder.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention wherein.

DETAILED DESCRIPTION OF PREFERRED EMBODIMENT

Reference will now be made in detail to the preferred embodiments of the present invention, examples of which are illustrated in the accompanying drawings.

Figure 1:
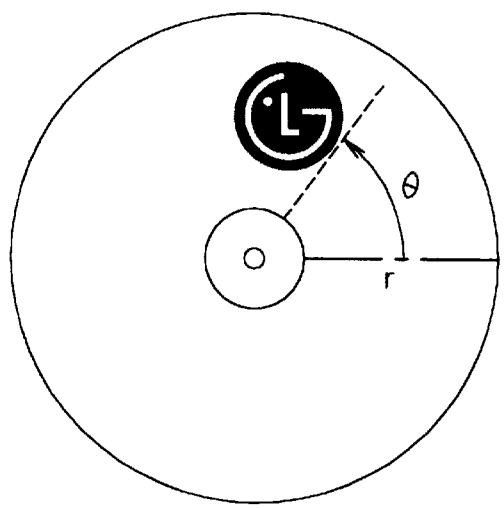
FIG. 1 is a diagram illustrating a file conversion principle of a label to be printed on the surface of an optical disc according to the present invention.
Figure 2:
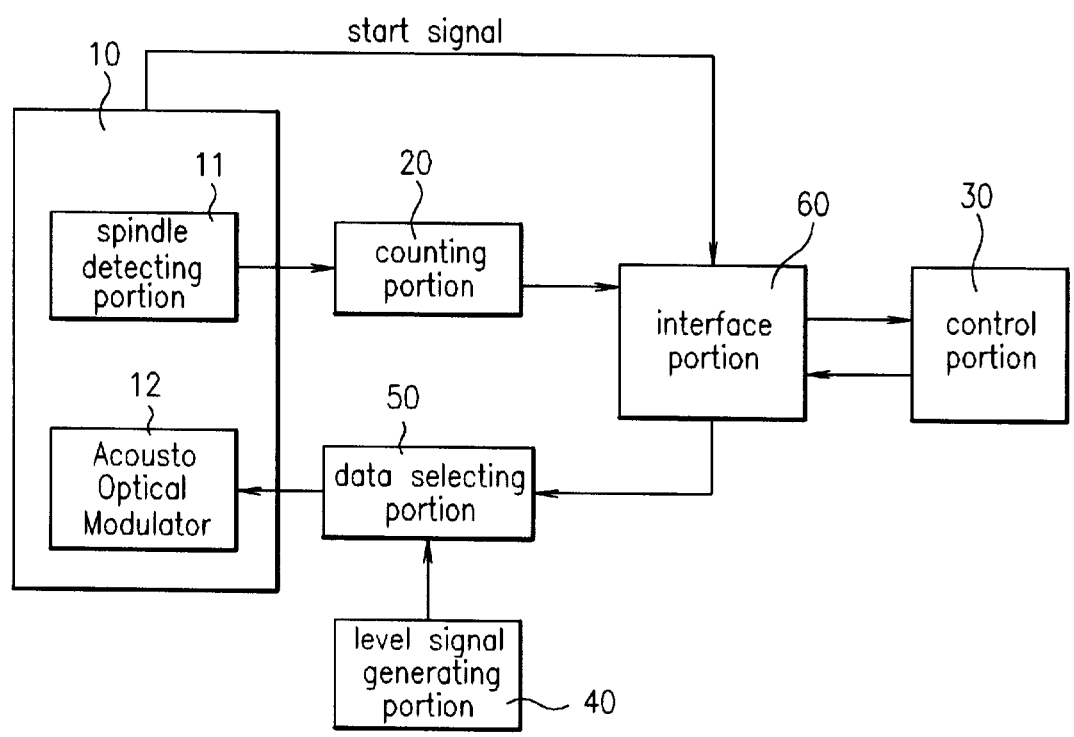
FIG. 2 is a block diagram illustrating a label printing apparatus of the optical disc using a rainbow graphic cutting system according to the present invention.

FIG. 1 is a diagram illustrating a file conversion principle of a label to be printed on the surface of an optical disc according to the present invention. FIG. 2 is a block diagram illustrating a label printing apparatus of the optical disc using of a rainbow graphic cutting system according to the present invention. And, FIG. 3 is a diagram illustrating a main part of a laser beam recorder.

Figure 3:
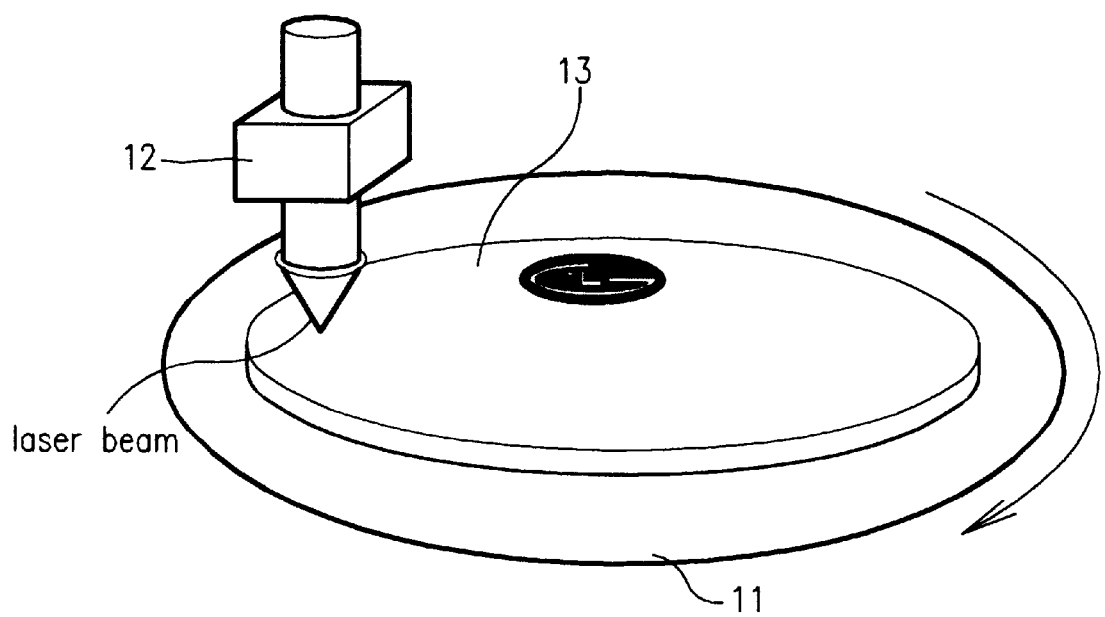
FIG. 3 is a diagram illustrating a main part of a laser beam recorder.

Referring to FIGS. 2 and 3, there are provided in the label printing apparatus of the present invention, a spindle detecting portion 11, a laser beam recorder 10 LBR consisting of an acousto optical modulator 12 AOM, a counting portion 20, a control portion 30, a level signal generating portion 40, a data selecting portion 50, and an interface portion 60. The spindle detecting portion 11 generates a pulse signal which is used for detecting the location of a spindle according to the rotation of the disc. The acousto optical modulator 12 prints a label on the surface of the disc under control operation of the laser beam. The counting portion 20 counts the pulse signal of the spindle detecting portion 11 by providing a start signal to the LBR 10. The control portion 30 outputs a corresponding data from among the rainbow graphic cutting system files in which information on the location and color of the label to be printed on the disc is stored by means of a counting signal of the counting portion 20. The level signal generating portion 40 generates 16 color signals whose duty cycles are different from each other. The data selecting portion 50 selects the color signal of the level signal generating portion 40 according to the control signal of the control portion 30, and outputs the selected signal to the AOM 12. The interface portion 60 input/outputs the signal of each part as well as the control portion 30.

According to the present invention, there will be explained hereinafter a method for printing a label on the surface of the optical disc using the RGCS.

As shown in FIG. 1, the printing method according to the present invention is first to mark the location of the drawing along radius and angle of the drawing to be printed on the surface of the disc by using a coordinate system. And, the printing method is to perform a RGCS file conversion by storing colors corresponding to each location in the memory by 16 levels in circumference of the disc. Thereafter, the RGCS file data is stored in the control portion 30. Then, if the start signal of the LBR is applied to the control portion 30 through the interface portion 60, the label printing operation of the optical disc begins to be performed and during the rotation of the spindle, there is outputted from the spindle detecting portion 11 the pulse signal including information on the present angle of the spindle. While the spindle is rotating in one cycle, 4200 pulse signals are generated. Then, the counting portion 20 counts the number of pulses according to the rotation of the spindle and outputs the pulse to the control portion 30 through the interface portion 60.

The control portion 30 senses the rotation location of the spindle depending upon the number of counted pulses, compares, by a sensing signal, the counted pulsed with the RGCS file data in which information on the location and color of the label to be printed is stored, and outputs data signal corresponding to the compared location to the data selecting portion 50 through the interface portion 60.

The data selecting portion 50 selects the color signal corresponding to the data, and outputs the signal to the AOM 12 of the LBR. The level signal generating portion 40 generates 16 signals which have different duty cycles from each other, and enables them to be matched with one another. For example, it is possible to print up to the 16th gray level by making a black colored signal to have the duty cycle of 0 and a white colored signal to have the duty cycle of 100%, respectively.

Thereafter, the label printing is completed by performing a switching operation under use of the signal inputted from the AOM 12, the switching operation being used for turning on/off the laser beam.

In such a label printing method, there is required 15 minutes as a minimum for printing the label on the whole optical disc, and the required spatial resolution is 50 $\mu$m.

Accordingly, there are provided efficiencies in the printing method under use of the RGCS in accordance with the present invention.

First, it is possible to operate the printing apparatus regardless of the CAV and the CLV because the location of the spindle can be sensed by the pulse signal generated based on the rotation of the spindle. Further, it is easy to replace the LBR with the various kinds of LBR, since it is possible to switch the mode under use into the other mode in the computer even during the label printing.

Second, it is possible to print various kinds of labels because there can be provided 16 gray levels.

Third, the printing time can be reduced, since it is possible to print the label on the whole optical disc with a minimum time.

It will be apparent to those skilled in the art that various modifications and variations can be made in the method for printing the label on the surface of the optical disc of the present invention without departing from the spirit or scope of the invention. Thus, it is intended that the present invention cover the modifications and variations of this invention provided they come within the scope of the appended claims and their equivalents.

What is claimed is:

1. A method for printing a label on an optical disc using a rainbow graphic cutting system, comprising the steps of:

storing, in a memory, location signals and color information data of the label to be printed on a surface of the optical disc;

selectively outputting a corresponding location signal and data signal from among the location signals and the color information data to a laser beam recorder; and printing the label corresponding to the location signal and the data signal output to the laser beam recorder on the surface of the optical disc, said step of storing including storing an address using a coordinate system corresponding to a radius and an angle of the label to be printed on the optical disk, and storing colors designated for the addresses in a memory by color level.

2. The method for printing a label on an optical disc as claimed in claim 1, wherein the location signal of the label is a pulse signal generated by rotation of a spindle of the laser beam recorder.

3. A method for printing a label on an optical disc, comprising the steps of:

graphically editing the label to be printed:

converting information on location and color of data of the label according to a radius and an angle using a coordinate system;

storing the converted information in a memory;

counting a pulse signal according to location of a spindle of a laser beam recorder;

detecting the location of the spindle depending upon a number of counted pulses;

outputting a data signal corresponding to the detected location from among rainbow graphic cutting system files; and printing the label on a surface of the optical disc based on an on/off operation of a laser beam in accordance with a switching operation of an acousto optical modulator.

4. A label printer comprising:

a laser;

a memory for storing location data and color data for labels to be printed on an optical disc;

a location detector for providing a location signal indicative of a location of the optical disc rotating on a spindle; and a controller for switching said laser on/off to print a label on a surface of the optical disc in accordance with the location data and the color data stored in said memory and the location signal provided by said location detector.

5. The label printer of claim 4, further comprising a level signal generator for generating a plurality of level signals having respective different duty cycles, said controller selecting one of the plurality of level signals for label printing based on the color data.

6. The label printer of claim 5, wherein the plurality of level signals correspond to different respective gray levels.

7. The label printer of claim 6, wherein the different respective gray levels comprise 16 gray levels.

8. The label printer of claim 4, wherein said location detector comprises:

a spindle detector for providing pulse signals indicative of rotation of the spindle; and a counter for counting the pulse signals to determine the location signal.

9. The label printer of claim 4, wherein the location data comprises addresses corresponding to a radius and an angle indicative of where a label is to be printed on the optical disc.

10. The label printer of claim 4, which is a rainbow graphic cutting system.

11. The label printer of claim 4, wherein said controller comprises an acousto-optical modulator for controlling switching of said laser based on the color data.

12. A method of printing a label on an optical disc comprising:

storing location data and color data for labels to be printed on the optical disc;

providing a location signal indicative of a location of the optical disc rotating on a spindle; and switching a laser on/off to print a label on a surface of the optical disc in accordance with the stored location data, the stored color data and the provided location signal.

13. The method of printing a label on an optical disc of claim 12, further comprising:

generating a plurality of level signals having respective different duty cycles, said step of switching comprising selecting one of the plurality of level signals for label printing based on the stored color data and switching the laser in accordance with the selected one of the plurality of level signals.

14. The method of printing a label on an optical disc of claim 13, wherein the plurality of level signals correspond to different respective gray levels.

15. The method of printing a label on an optical disc of claim 14, wherein the different respective gray levels comprise 16 gray levels.

16. The method of printing a label on an optical disc of claim 12, wherein said step of providing a location signal comprises:

providing pulse signals indicative of rotation of the spindle; and counting the pulse signals to determine the location signal.

17. The method of printing a label on an optical disc of claim 12, wherein said step of storing location data and color data comprises storing addresses corresponding to a radius and an angle indicative of where a label is to be printed on the optical disc.

18. The method of printing a label on an optical disc of claim 12, wherein said step of switching comprises modulating the laser with an acousto-optical modulator based on the color data.

* * * * *